United States Patent
Meftah et al.

(10) Patent No.: US 11,709,270 B1
(45) Date of Patent: Jul. 25, 2023

(54) METHOD OF PROCESSING AZIMUTH, ELEVATION AND RANGE DATA FROM LASER SCANNING AN OBJECT

(71) Applicant: Cintoo SAS, France, Sophia Antipolis (FR)

(72) Inventors: Anis Meftah, Valbonne (FR); Leonardo Hidd Fonteles, Nice (FR)

(73) Assignee: Cintoo SAS, France, Sophia Antipolis (FR)

( * ) Notice: Subject to any disclaimer, the term of this patent is extended or adjusted under 35 U.S.C. 154(b) by 1,044 days.

(21) Appl. No.: 16/428,104

(22) Filed: May 31, 2019

Related U.S. Application Data

(60) Provisional application No. 62/679,584, filed on Jun. 1, 2018.

(51) Int. Cl.
  *G01S 17/89* (2020.01)
  *G06T 17/20* (2006.01)
  *G01S 7/48* (2006.01)

(52) U.S. Cl.
  CPC ............ *G01S 17/89* (2013.01); *G01S 7/4808* (2013.01); *G06T 17/205* (2013.01)

(58) Field of Classification Search
  CPC ........ G06T 17/00; G06T 17/20; G06T 17/205; G01S 17/89; G01S 7/4808
  See application file for complete search history.

(56) References Cited

U.S. PATENT DOCUMENTS

| | | | |
|---|---|---|---|
| 5,886,702 A * | 3/1999 | Migdal et al. | G06T 17/20 345/423 |
| 8,660,187 B2 | 2/2014 | Antonini et al. | |
| 8,745,110 B2 | 6/2014 | Antonini et al. | |
| 2002/0018066 A1* | 2/2002 | Vizer | G06T 17/20 345/428 |
| 2016/0335799 A1 | 11/2016 | Antonini et al. | |
| 2017/0169603 A1* | 6/2017 | Chen et al. | H04N 1/00827 |
| 2019/0370614 A1* | 12/2019 | Crouch et al. | G06V 10/40 |

OTHER PUBLICATIONS

Bletterer et al: "De la carte de profondeur au maillage surfacique: reconstruction de scènes 3D complexes," (http://hal.archives-ouvertes.fr/hal-01566943/document), (2017) 4 pages.
Corsini et al. "Efficient and Flexible Sampling with Blue Noise Properties of Triangular Meshes," (http://ieeexplore.ieee.org/document/6143943/), (Jul. 2011) 12 pages.
Alboul, Lyuba, and Georgios Chliveros. "A system for reconstruction from point clouds in 3D: Simplification and mesh representation." 2010 11th International Conference on Control Automation Robotics & Vision. IEEE, 2010. (Year: 2010).*

* cited by examiner

*Primary Examiner* — Daniel F Hajnik
(74) *Attorney, Agent, or Firm* — Neugeboren O'Dowd PC

(57) ABSTRACT

A method of generating point cloud data from a laser scanning device, retaining a scanner pattern based on point cloud data, and generating an abbreviated mesh from the point cloud such that it can be faithfully restored to the original point cloud. The point cloud data must be structured such that azimuth, elevation, and range data can be extracted. The abbreviated mesh version of the point cloud is generated utilizing selected azimuth, elevation, and range data. Scanner patterns are generated utilizing the azimuth and elevation data. To faithfully regenerate the point cloud data from the abbreviated mesh, the mesh and the scanner pattern are cross referenced such that the regenerated point cloud has minimal data loss.

17 Claims, 3 Drawing Sheets

METHOD OF PROCESSING AZIMUTH, ELEVATION AND RANGE DATA FROM LASER SCANNING AN OBJECT

CROSS-REFERENCE TO RELATED APPLICATIONS

This non-provisional patent application claims priority under 35 U.S.C. § 119(e) to U.S. Provisional Application No. 62/679,584, filed on Jun. 1, 2018, and entitled "METHOD TO TRANSFORM STRUCTURED TERRESTRIAL LASER SCANS INTO A SURFACE MESH AND TO INVERSELY TRANSFORM A SURFACE MESH INTO STRUCTURED TERRESTRIAL LASER SCANS", the disclosure of which is hereby incorporated by reference in its entirety for all purposes.

FIELD OF THE INVENTION

The present invention relates to creating representations of objects, particularly creating electronic building representations using laser scanning.

BACKGROUND OF THE INVENTION

The AEC (Architecture, Engineering, Construction) industry commonly uses laser scanning devices to capture construction related images. Recently, there has been an initiative to utilize laser scanners to visualize 3D building data, more commonly known as building information modeling ("BIM"). BIM relates to various digital technologies that help manage the various phases of building design and construction. "Reality Capture," the digitization of the real world, is the result of technology breakthroughs in 3D laser scanning. Reality Capture requires modem laser scanners with advanced motor movement, wide angle enabled capture, and precise lens and laser mirror adjustment. Data from laser scanners are already largely used in AEC for various uses including surveying, topography analysis, construction, and AEC virtual reality content experiences for real estate marketing.

Within the last decade, laser scanning devices have dramatically improved in scanning precision and 3D visualization of AEC applications. Laser scanner data is referred to as "Reality Data," and is now commonly visualized or edited by most Computer Assisted Drawing ("CAD") software developed by companies like Autodesk, Bentley Intergraph, Siemans, and ESRI. Since laser scanners use line-of-sight technology, several vantage points or scanning positions are needed to capture any scene and to avoid occlusions. Each scanning position typically generates a set of 3D points in space where those 3D points are arranged in a panoramic depth map with an intensity value for each 3D point. Laser scanners can generate between a few million points to a few hundred million points from each scanning position depending on the capacity of the hardware and the timing of scanning.

With these improvements, laser scanners remain extremely data intensive. One single scanning position can generate data up to several Gigabytes, depending on the number of points captured by the device. Given that large scale AEC scanning projects can require numerous scanning vantage points, each with hundreds of millions of 3D points and their respective depth map and intensity data, the outputted Reality Data files can be enormous.

Once the data has been captured, the various scanning positions must be aligned in a single coordinate system, a process known as "registration". Scanner manufacturers and CAD software vendors provide automatic or automated desktop-based registration software, making this process accessible to non-experts. They all generate a "structured" point cloud. A structuring of the point cloud adds the transformation matrix to each scanning position relative to a user-defined origin. Typically, the first scan used during the registration process will be used as the origin of the Reality Data. The end deliverables after registration are a unique 3D point cloud built from all the depth maps using the various scan vantage points and a set of panoramic images aligned with the depth maps.

These point clouds are used to make accurate measurements, create annotations, and are frequently utilized in most CAD software today to serve as modeling references to get a 3D model that corresponds to the exact as-built conditions, a process called "Scan-to-BIM". But handling or visualizing this Reality Data is difficult on most workstations because of its intensive memory requirements. Even when scanning the indoor of small buildings, for instance, gigantic point clouds are obtained that are composed of billions of 3D points.

In order to more easily handle or visualize the gigantic point clouds, various data compression techniques have been implemented to allow for feasible file sharing, uploading, and computing. An existing solution for point cloud compression is the implementation of various 3D point meshing techniques. Examples of 3D meshing techniques are disclosed in Cintoo's published U.S. Pat. Application No. 2016/0335799A1 and U.S. Pat. Nos. 8,660,187 and 8,745,110.

Relevant meshing information can also be found in "De la carte de profondeur au maillage surfacique: reconstruction de scenes 3D complexes" (https://hal.archives-ouveries.fr/hal-01566943/document) and "Efficient and Flexible Sampling with Blue Noise Properties of Triangular Meshes" (https://ieeexplore.ieee.org/document/6143943/).

Most meshing techniques drastically reduce the number of points by subsampling the point cloud. The abbreviated mesh resulting from the point cloud to mesh transformation is typically 10 to 30 times lighter than the raw point cloud data. Upload times and storage capacity requirements for the resulting mesh are reduced in the same ratios. While reducing the overall file size, these meshing techniques often result in a loss of some important topographical information. Because the accuracy of the data structure has been impacted, the mesh representations tend to have poorer resolution and are never as fully comprehensive as the point cloud representations of the laser scanner outputted data. If a full point cloud representation needs to be regenerated from the mesh, the information lost during the meshing process often causes the regenerated point cloud to have poor resolution. Accordingly, a problem exists as to faithfully regenerating the point cloud data from the compressed mesh without actually referencing the original gigantic laser scanning Reality Data.

BRIEF SUMMARY OF THE INVENTION

The present invention is directed towards a method of generating point cloud data from a laser scanning device, retaining a scanner pattern based on point cloud data, and generating an abbreviated mesh from the point cloud such that it can be faithfully restored to resemble the original point cloud. This method particularly relates to AEC scanning applications such that the regenerated point cloud maintains the project structure of the original point cloud with minimal or no compromise to accuracy.

The present invention provides simultaneous generation of a scanner pattern along with mesh from the point cloud data. In order to do so, the point cloud must be outputted from a laser scanner such that azimuth, elevation, and range data can be interpreted from the captured Reality Data. Generally, range is defined by the distance between the laser scanner point of origin and the captured object. Laser scanners typically use "time-of-flight," "phase based," or "waveform processing" technology to measure range. Azimuth and range data is generally calculated by the intensity values of each 3D point.

A "3D point" is an electronic representation of a point on an object as viewed from a vantage point which contains range, azimuth and elevation data about that point. Range, reflectivity, and angle of incidence are the main factors that affect intensity. Accordingly, azimuth and elevation figures are often tied to the pivoting motor movement of the laser scanning device and the angle of incidence of the laser scanner mirrors.

In order to enable regeneration of the point cloud from the mesh with little or no compromise on accuracy, a scanner pattern correlating to the laser scanner azimuth and elevation data is generated and saved. Each laser scanner has its own scanner pattern describing the way it scans the 3D points of a captured object. These points then correlate to a specific grid, corresponding to the motor rotation and laser mirror movement of the laser scanner. The pivoting motor rotation defines the azimuth. Angular laser mirror movement defines the elevation. The scanner pattern is generated using the azimuth and elevation data from the point cloud. Specifically, the scanner pattern is composed of five small arrays of floats and two images of correction permitting the retrieval of the azimuth and elevation.

After both the mesh and the scanner pattern are generated, they are each individually saved such that either the mesh and/or the scanner pattern can be remotely accessed. The present invention relies on such remote access of both the abbreviated mesh and the scanner pattern in order to faithfully regenerate the point cloud.

In order to regenerate the point cloud data from the abbreviated mesh, the present invention requires access to both the abbreviated mesh and the saved scanner pattern. Azimuth and elevation components saved in the scanner pattern are utilized to generate simulated vectors originating from each of the laser scanner vantage points. These vectors are then intersected with the mesh points, including interpolated mesh points defined within regions of the mesh, to identify the points of the point cloud. Intersections created between the vectors and mesh points identify all the remaining 3D points which faithfully regenerate the point cloud data from the abbreviated mesh version of the point cloud.

DETAILED DESCRIPTION OF THE INVENTION

Figure 1:
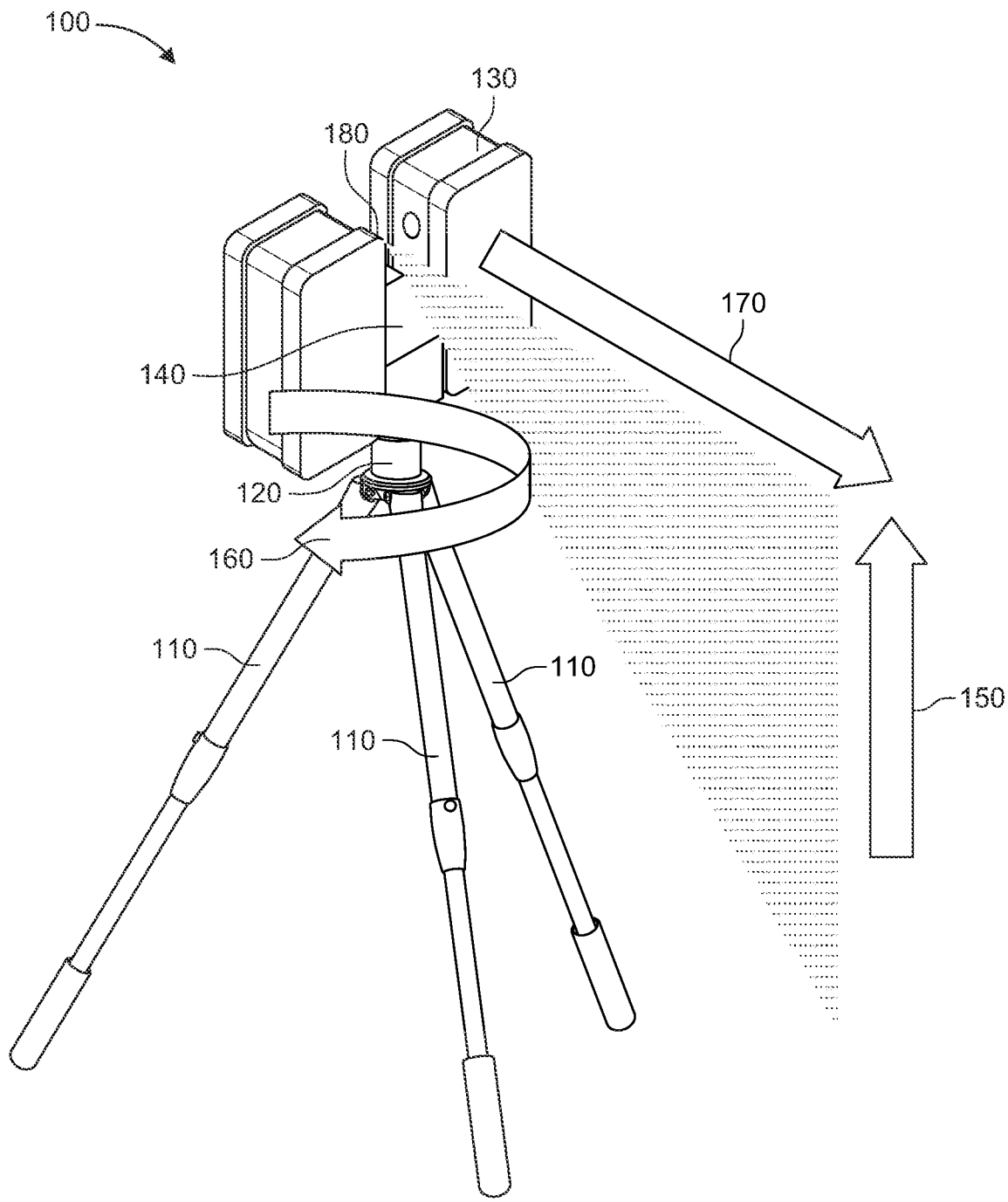
FIG. 1 is preferred laser scanner.

Referring now to FIG. 1, a preferred laser scanner 100 is shown. The laser scanner 100 includes tripod mounting legs 110, a pivoting motor 120, a laser scanning head 130 and a laser mirror 140. The tripod mounting legs 110 aid in ensuring the laser scanner 100 is securely grounded and stable. The stability of the laser scanner 100 is essential to maintaining a consistent singular vantage point 180 for each scanning capture, even when the laser scanner 100 is rotating on its pivoting motor 120. Most laser scanners 100 can directionally pivot by motor movement. The pivoting motor 120 preferably enables the laser scanner 100 to capture its object with a horizontal 360 degree capture radius. Each laser scanner 100 has its own scanner movement 150, 160, 170, which correlates to how it samples the points of a captured object. The laser scanner 100 captures a large number of 3D points which it in turn defines onto a specific grid. In one embodiment, the grid corresponds to the motor rotation 160 and laser mirror movement 150 of the laser scanner 100. The motor rotation 120 defines the azimuth of the captured points. The movement of the mirror 140 reflecting the laser defines the elevation of the points 150. Finally, the time it takes the light to return to the laser scanner defines the range 170.

In one embodiment, the angular displacement degree of each captured 3D point, relative to the vantage point 180, corresponds to the azimuth data. In other embodiments, the pivoting motor 120 may be directly attached to the laser scanning head 130 or alternatively is incorporated within the laser scanning head 130 itself. In other embodiments, the pivoting motor 120 is non-existent, only the laser scanning head 130 is enabled with 360 degree capture without pivotal movement.

Various elevations are typically scanned by the repositioning of the mirror 140 which reflects the scanning laser 150. Similarly, laser scanner applications are performed from static vantage points 180 using "time of flight", "phase based" or "waveform processing" technology to measure distances, otherwise known as range 170.

There are many different models of laser scanners 100 which are compatible with the present invention such as the Leica BLK 360, made by Leica Geosystems. All preferred laser scanners 100 capture 3D data reflective of the captured object. In some embodiments, laser scanners 100 are capable of outputting 3D data in the form of a point cloud. All preferred laser scanners 100 are enabled to store 3D or point cloud data which can be locally or remotely accessed. In other embodiments, the outputted 3D data must be processed by a registration process in order to structure the raw 3D data into point cloud data.

Some embodiments of preferred laser scanners 100 may also capture HDR (High Dynamic Range) panoramic images. The image horizontal coverage is usually close to 360 degrees. Due to the tripod 110, the maximum vertical coverage range is typically 300 degrees. The panoramic image provides the Red, Green, and Blue value for each 3D point. If the laser scanner does not capture a panoramic image, each 3D point is typically "colored" according to its intensity value.

Figure 2:
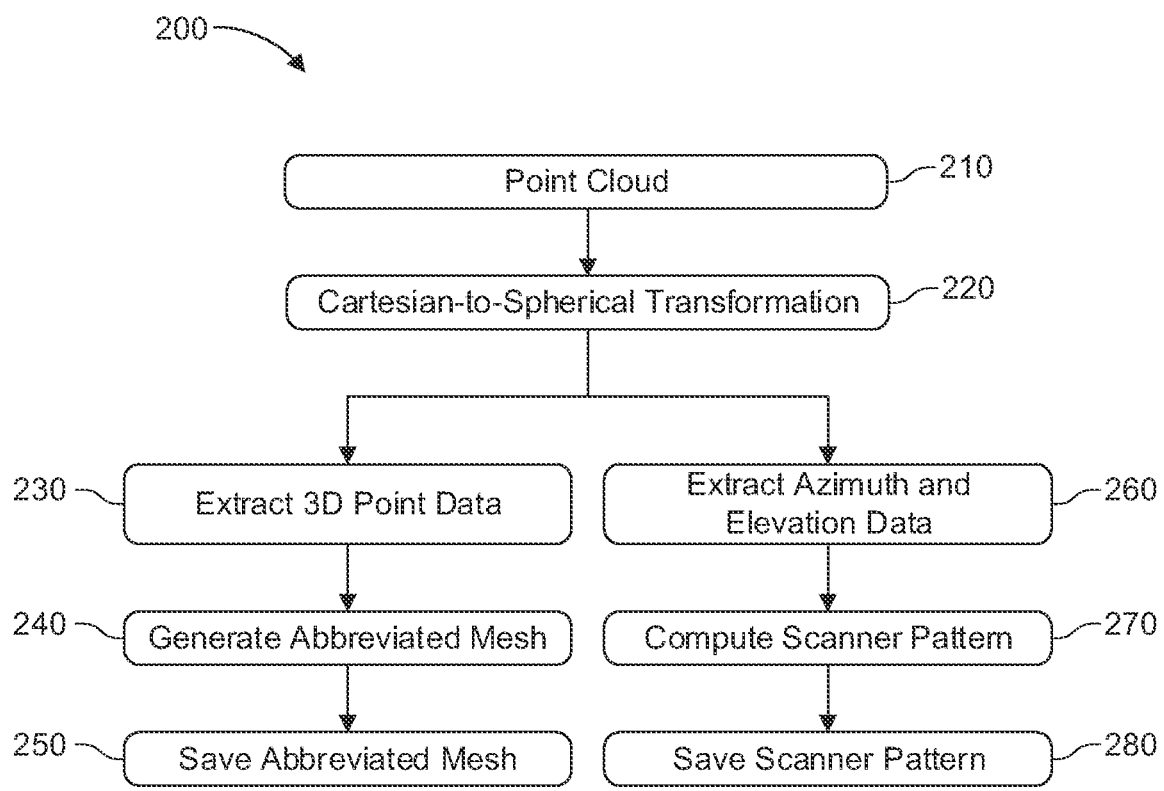
FIG. 2 is a flowchart diagram of an exemplary method illustrating how the mesh and scanner patterns are preferably generated from the point cloud.

Referring now to FIG. 2, a preferred technique 200 is shown for creating abbreviated subsets of the point clouds, including a mesh 240 and a scanner pattern 270. The present invention analyzes a point cloud 210. The point cloud 210 is structured from the laser scanner 3D data such that each 3D point's azimuth, elevation, and range is present. Typically, the point cloud 210 is structured in a Cartesian coordinate domain. In order to generate the azimuth, elevation, and range data corresponding to the scanned object, a Cartesian-to-Spherical transformation 220 is required. Such Cartesian-to-Spherical transformations methods 220 are well known in the art. In some embodiments, the point cloud 210 is already formatted in a spherical domain. If the point cloud 210 is in a spherical domain, the Cartesian-to-Spherical transformation step 220 is optional. In one embodiment, where the point cloud 210 is composed of several depth maps, the point cloud 210 is analyzed by processing the each of the point cloud's depth maps sequentially.

When the point cloud 210 is in a spherical domain, azimuth and elevation data 260, and 3D point data 230, are easily extracted after the transformation. Using the extracted 3D point data 230, an abbreviated mesh can be generated 240. The present invention enables the use of any well-known 3D point meshing techniques to generate the abbreviated mesh version of the point cloud.

In one preferred embodiment, meshing 240 is accomplished by first computing range discontinuities. These discontinuities function to identify generally where borders exist within the scanned object's representative 3D point cloud data. This is done by grouping and ordering the range image pixels having the same or similar type of range discontinuities. By grouping pixels surrounding the identified borders, regions can be computed. Another embodiment for meshing 240 utilizes a region growth technique to spread each grouping of pixels to spread the computation of regions, so long as the grouping surrounds the same border. In order to more accurately define the computed regions, levels of details are computed. The lowest level of detail, "LOD 0", is computed by choosing the most relevant points of each region. In one embodiment, relevant points include pre-classified key points, points that form sharp edges, or points that form corners. Using the relevant points of each region, a valid triangulation is generated. Triangulation is achieved by connecting the relevant points of each region. This triangulated set of relevant points for a region then form the LOD 0. Typically, the LOD 0 is insufficiently detailed. Accordingly, the LOD 0 is refined and replaced by further refined LOD (n > 0). In one embodiment, the further refined LOD (n > 0) are computed using the previously computed LOD. This refinement process continues to generate further level of details until a target quality level of detail is achieved. Target quality can be determined by analyzing the prior LOD and subdividing the prior LOD triangulation into a plurality of new regions to triangulate. In that embodiment, the resulting further triangulation would be a refinement of the prior LOD. When a target quality LOD is generated for each region of the point cloud, all the regions target LODs are combined to encompass an abbreviated mesh 240.

In other preferred embodiments, meshing 240 can be accomplished utilizing other algorithms including a Voronoi partitioning algorithm or a blue noise triangulation algorithm.

After a mesh is generated 240, the mesh must be stored such that it can be remotely accessed 250. Various storing techniques are well known in the art. Such embodiments include local electronic storage, cloud based storage, server based storage, or external electronic storage mediums.

In order to enable the regeneration of the point cloud from the mesh with no compromise on accuracy, a scanner pattern correlating to the laser scanner is generated 270 and saved 280. Each laser scanner has its own scanner pattern describing the way it scans the 3D points of a captured object. These points then correlate to a specific grid corresponding to the range of the captured object, motor rotation and laser mirror movement of the laser scanner. The pivoting motor rotation defines the azimuth and angular mirror movement defines the elevation. The scanner pattern is generated using the azimuth and elevation data from the point cloud 260. In one embodiment, the scanner pattern is composed of five small arrays of floats and two images of correction permitting the retrieval of the azimuth and elevation. The scanner pattern 270 is computed by analyzing the spherical domain point cloud azimuth and elevation data 260. Typically, a scanner pattern is required for each vantage point capture of the laser scanner. However, in other embodiments, a single scanner pattern may encompass all laser scanner vantage point captures.

After the scanner patterns are generated 270, the mesh must be stored such that it can be remotely accessed 280. Various storing techniques are well known in the art. Such embodiments include local electronic storage, cloud based storage, server based storage, or external electronic storage mediums.

Figure 3:
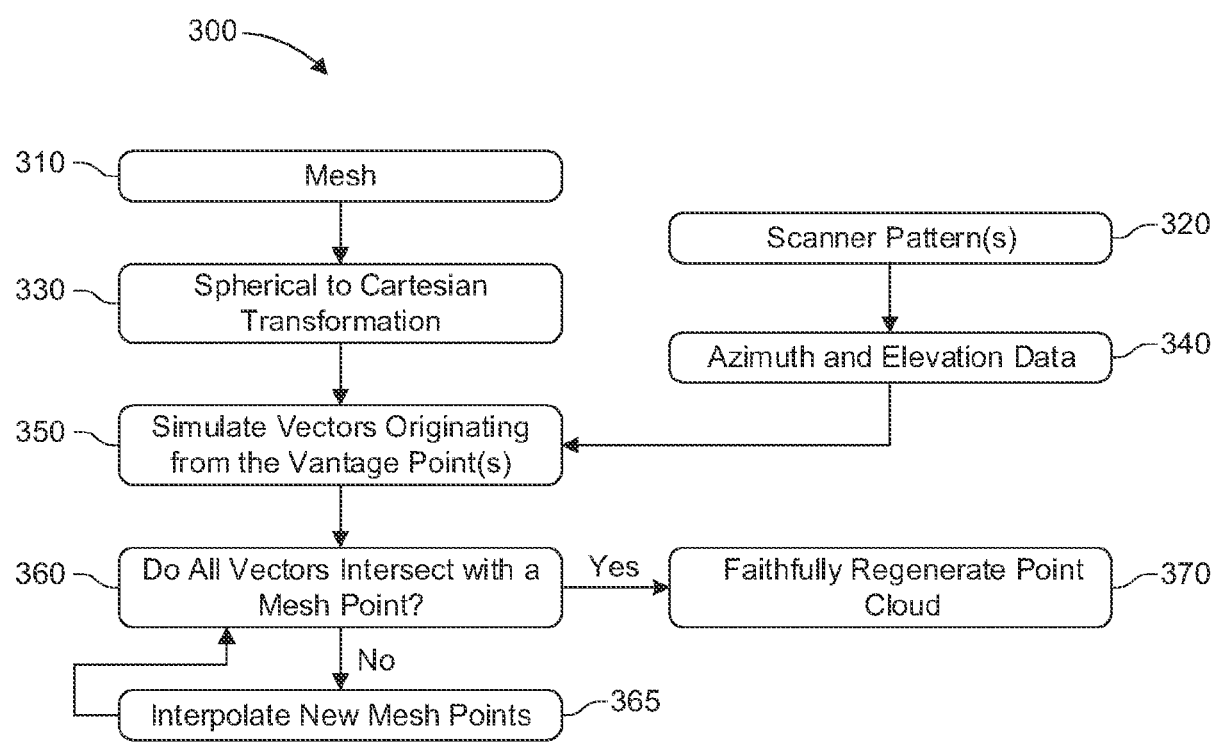
FIG. 3 is a flowchart diagram of an exemplary method illustrating how the point cloud is preferably regenerated using the mesh and scanner pattern.

Referring to FIG. 3, a preferred technique 300 is illustrated to faithfully regenerate the point cloud 370 from the stored mesh 310 and scanner pattern 320. Faithfully restoring the mesh back into the original point cloud 370 with minimal data loss is difficult. The present invention seeks to allow sharing and collaborating with the smaller file size using the abbreviated mesh version 310 of the point cloud, while also enabling the access to the complete, faithful regeneration of said original point cloud 370.

In order to faithfully regenerate the point cloud 370, the present invention requires access to the stored mesh 310 and scanner patterns 320. To recreate the Cartesian grid domain of the original point cloud, the spherical domain mesh 310 must be transformed into a Cartesian domain 330.

The mesh 310 and the scanner pattern 320 are comprised of the range, azimuth, and elevation data. After the mesh is transformed in a Cartesian domain grid 330, the missing 3D points of the point cloud must be regenerated in order to faithfully restore the point cloud 370. The missing 3D points are regenerated using the stored azimuth, elevation, and range data from the vantage point associated with each mesh point.

From each of the laser scanner vantage points, vectors are simulated 350 according to the scanner pattern's respective azimuth and elevation data 340. Specifically, the vectors, representative of each and every 3D point of the point cloud, are simulated from their respective originating vantage point 350. The direction of each vector's path is then calculated according to each 3D point's azimuth and elevation data 340, which is respectively stored in the scanner pattern 320. Each of the vectors are set with an arbitrary range that exceeds the maximum scanning range of the laser scanner. In one embodiment, said vector range is set to 1000 meters because the laser scanner is only capable of scanning objects within 600 meters. The actual range of each vector is then calculated by identifying the intersection between each vector's path and the 3D point cloud points yet to be regenerated. Since each of the mesh points are points included in the point cloud, these intersection points between the simulated vectors and the mesh points are valid point cloud points.

Naturally, the entire set of point cloud points is many times larger than the set of mesh points. Accordingly, there are numerous vectors simulated 350 which require a range calculation via intersection with a mesh point. Therefore, to compute the missing mesh points existing in the point cloud which intersect with the simulated vectors 360, new interpolated points 365 must be identified among the mesh points.

One embodiment of new mesh point interpolation 365 can be accomplished by randomly selecting points within the mesh. Another embodiment of new mesh point interpolation 365 involves subdividing the mesh into different regions and interpolating each region with new points. Another embodiment of new mesh point interpolation 365 first involves triangulating sets of three nearby mesh points to define triangulated regions of the mesh 310. Within each triangulated region, points are interpolated according to a predefined relevancy. In one embodiment, relevant points include pre-classified key points, points that form sharp edges, or points that form corners.

In another embodiment, for all interpolated new mesh points, there will either be an intersection or no intersection 360 with the simulated vectors 350. If an intersection 360 with a simulated vector 350 exists, that point is combined with other mesh point and vector intersections to define the point cloud 370. In the case of no intersection with any existing mesh points triangulations, the interpolated point will be invalid and disregarded. This embodiment's process of interpolation continues until all the simulated vectors are intersected with a mesh point 360, 365, 370. When all the vectors have been intersected with a mesh point, the summation of all the intersecting points faithfully defines the regenerated point cloud 370.

Another embodiment of new mesh point interpolation first involves triangulating sets of three nearby mesh points to define triangulated regions of the mesh 310. Interpolation of the missing point cloud points 365 are generated by identifying the vector intersection with the triangulated regions of the mesh. Specifically, the vector 350 direction is known as defined by the azimuth and elevation data 340. However the range of the vector 350 is unknown until a valid intersection is defined between the vector and the triangulated region of the mesh 310. Accordingly, each intersection with the triangulated region will define the range of the vector and therefore define its 3D point cloud point 370. The summation of all intersections between triangulated regions and vectors 350 define the summation of point cloud points 370.

In the foregoing specification, the invention has been described with reference to specific preferred embodiments and methods. It will, however, be evident to those of skill in the art that various modifications and changes may be made without departing form the broader spirit and scope of the invention as set forth in the appended claims. The specification and drawings are, accordingly to be regarded in an illustrative, rather than restrictive sense; the invention being limited only by the appended claims.

What is claimed is:

1. A method of analyzing data generated by laser scanning an object comprising the steps of:
    selecting a laser scanner capable of generating azimuth, elevation and range data from an object;
    using said laser scanner to generate said elevation, azimuth and range data from said object;
    combining said azimuth, elevation, and range data into a point cloud;
    using selected azimuth, elevation, and range data in said point cloud to generate a mesh representative of said object;
    storing said mesh so that it can be remotely accessed;
    using azimuth and elevation data from said point cloud to create a scanner pattern, wherein the scanner pattern is created without range data;
    storing said scanner pattern such that it can be remotely accessed; and
    regenerating said point cloud by combining said mesh and said scanner pattern data.

2. The method of claim 1 wherein Cartesian-to-Spherical data conversion is utilized to generate said mesh.

3. The method of claim 1 wherein a Voronoi partitioning algorithm is utilized to generate said mesh.

4. The method of claim 1 wherein a triangulation algorithm is utilized to generate said mesh.

5. The method of claim 1, wherein a range discontinuity calculation algorithm is utilized to generate said mesh.

6. The method of claim 1 wherein depth maps constituting said point cloud is processed sequentially.

7. The method of claim 4 wherein only regions with overlapping triangulation are utilized to generate said mesh.

8. The method of claim 1 wherein interpolation techniques are utilized to regenerate said point cloud.

9. The method of claim 1 wherein vector simulation techniques are utilized to regenerate said point cloud.

10. The method of claim 9, further comprising:
    generating a plurality of simulated vectors, wherein each of the plurality of simulated vectors originates from a laser scanner vantage point associated with a mesh point of the mesh representative of said object, and wherein generating the plurality of simulated vectors is based at least in part upon the azimuth and elevation data corresponding to the scanner pattern;
    intersecting one or more of the plurality of simulated vectors with a corresponding mesh point to identify one or more 3D points corresponding to the point cloud that are not in the mesh; and
    regenerating the point cloud based at least in part on:
    (1) identifying the one or more 3D points that are not in the mesh, and
    (2) the mesh representative of said object.

11. A method of regenerating a point cloud representation of an object from an abbreviated mesh comprising:
    selecting a laser scanner capable of generating azimuth, elevation and range data from the object;
    using said laser scanner to generate said elevation, azimuth and range data from the object from a plurality of vantage points;
    generating a point cloud based on combining said azimuth, elevation, and range data;
    using selected azimuth, elevation, and range data in said point cloud to generate an abbreviated mesh representative of said object;
    storing said abbreviated mesh so that it can be remotely accessed;
    using azimuth and elevation data from said point cloud to create a scanner pattern;
    storing said scanner pattern such that it can be remotely accessed;
    generating a plurality of simulated vectors, wherein each of the plurality of simulated vectors originates from one of the plurality of vantage points, and wherein generating the plurality of simulated vectors is based at least in part upon the azimuth and elevation data corresponding to the scanner pattern;
    identifying one or more interpolated mesh points within regions of the abbreviated mesh; and
    regenerating, using vector simulation techniques, said point cloud by combining said abbreviated mesh and said scanner pattern, wherein regenerating said point cloud is further based on intersecting the plurality of simulated vectors with one or more of the abbreviated mesh and the one or more interpolated mesh points.

12. The method of claim 11, wherein the abbreviated mesh comprises a plurality of 3D mesh points, and wherein each of the plurality of vantage points is associated with a 3D mesh point of the abbreviated mesh.

13. The method of claim 12, wherein regenerating said point cloud further comprises:
   identifying, based at least in part on the intersecting the plurality of simulated vectors with the abbreviated mesh and the one or more interpolated mesh points, a plurality of 3D points corresponding to the point cloud; and
   combining the plurality of 3D points with the plurality of 3D mesh points of the abbreviated mesh to regenerate said point cloud.

14. The method of claim 11, wherein one or more of a Cartesian-to-Spherical data conversion, a Voronoi partitioning algorithm, a triangulation algorithm, and a range discontinuity calculation algorithm is utilized to generate said abbreviated mesh.

15. The method of claim 11, wherein depth maps constituting said point cloud are processed sequentially.

16. The method of claim 15, wherein only regions with overlapping triangulation are utilized to generate said abbreviated mesh.

17. The method of claim 11, wherein the scanner pattern is created without range data.

* * * * *